US012641070B2

(12) United States Patent
Romansky et al.

(10) Patent No.: US 12,641,070 B2
(45) Date of Patent: May 26, 2026

(54) SYSTEM AND METHOD FOR GENERATING AUTOMATED FUNDING OPPORTUNITY FEEDS

(71) Applicant: Convolution Solutions, LLC, Monroe, CT (US)

(72) Inventors: Brian Michael Romansky, Monroe, CT (US); Sohail Ramzan Ali, Mississauga (CA); Jennifer Leigh Petricevic, Port Elgin (CA); Anish Hasmukhlal Darji, Brampton (CA); Robbie Darling, Brant County (CA)

(73) Assignee: Convolution Solutions, LLC, Monroe, CT (US)

( * ) Notice: Subject to any disclaimer, the term of this patent is extended or adjusted under 35 U.S.C. 154(b) by 100 days.

(21) Appl. No.: 18/504,389

(22) Filed: Nov. 8, 2023

(65) Prior Publication Data

US 2024/0163272 A1     May 16, 2024

Related U.S. Application Data

(60) Provisional application No. 63/383,409, filed on Nov. 11, 2022.

(51) Int. Cl.
*H04L 9/40* (2022.01)
*G06F 16/9535* (2019.01)
*H04L 67/306* (2022.01)

(52) U.S. Cl.
CPC ...... *H04L 63/0807* (2013.01); *G06F 16/9535* (2019.01); *H04L 67/306* (2013.01)

(58) Field of Classification Search
CPC .............. H04L 63/0807; H04L 67/306; G06F 16/9535
USPC .............................................. 726/9; 709/206
See application file for complete search history.

(56) References Cited

U.S. PATENT DOCUMENTS

| | | | | |
|---|---|---|---|---|
| 10,963,553 | B2 * | 3/2021 | Bykampadi | ......... H04L 63/0884 |
| 11,023,675 | B1 * | 6/2021 | Neervannan | .......... G06F 40/211 |
| 2007/0073754 | A1 * | 3/2007 | Friedlander | .......... G06F 16/335 |
| 2022/0021751 | A1 * | 1/2022 | Devine | ................ H04L 9/3234 |
| 2022/0292593 | A1 * | 9/2022 | Watfa | ................. G06Q 30/0207 |

FOREIGN PATENT DOCUMENTS

JP          2001076033  A  *  3/2001

* cited by examiner

*Primary Examiner* — Liang Che A Wang
(74) *Attorney, Agent, or Firm* — CPST Intellectual Property Inc.; Brett J. Slaney

(57) ABSTRACT

A system and method are provided for notifying individuals of funding opportunities. The method includes obtaining funding information from one or more sources and populating a database, obtaining profile data for a plurality of individuals, and using the funding information and profile data to conduct a matching process. The method also includes, responsive to detecting a match, generating an electronic communication addressed to a matched individual; generating a token to permit access to information by interacting with the token; incorporating the token into the electronic communication; sending the electronic communication to the matched individual; and responsive to a reply triggered by interacting with the token, providing access to the information.

18 Claims, 8 Drawing Sheets

SYSTEM AND METHOD FOR GENERATING AUTOMATED FUNDING OPPORTUNITY FEEDS

CROSS-REFERENCE TO RELATED APPLICATION(S)

This application claims priority to U.S. Provisional Patent Application No. 63/383,409 filed on Nov. 11, 2022, the entire contents of which are hereby incorporated by reference.

TECHNICAL FIELD

The following generally relates to matching funding opportunities, such as grant and/or corporate sponsorship projects, with candidate researchers, in particular to generating automated funding opportunity feeds for such researchers.

BACKGROUND

Research universities, private labs and individual researchers typically depend on external funding to finance research operations. These entities are also often ranked and/or recognized in their field and beyond based on funds that are awarded. Researchers also typically need to apply for funding that aligns with their research. However, matching researchers with funding is administratively challenging and normally almost completely manual. For example, either researchers are tasked with spending time finding, reviewing and applying for funding—thus distracting from research efforts; or research service officers (RSOs) are required. In addition to the costs associated with having RSOs, these officers require knowledge of, and relationships with, the researchers to whom they serve. These challenges can add complexities to the process even if offloading the burden from the researchers.

SUMMARY

Since profile tools are found to not be integrated with communication and workflow protocols for funding applications (e.g., grants, corporate sponsorship projects, etc.), the current systems in place for matching researchers with funding opportunities still face challenges and lack automated and other technological tools to empower RSOs and researchers themselves to take advantage of the numerous opportunities that may exist.

To address these challenges, a platform is provided that uses proprietary matching and data analytical algorithms to pair researchers with optimal funding opportunities, reducing the time and effort to find and connect with funding. The platform produces targeted communications to the researcher from the RSOs, increasing applications for funding. While examples described below may refer specifically to grant or corporate sponsorship project opportunities, the platform and technical tools described herein can equally apply to any funding opportunity.

In one aspect, there is provided a method of notifying individuals of funding opportunities, comprising: obtaining funding information from one or more sources and populating a database; obtaining profile data for a plurality of individuals; using the funding information and profile data to conduct a matching process; responsive to detecting a match, generating an electronic communication addressed to a matched individual; generating a token to permit access to information by interacting with the token; incorporating the token into the electronic communication; sending the electronic communication to the matched individual; and responsive to a reply triggered by interacting with the token, providing access to the information.

In an example embodiment, the method can further include adding the electronic communication to a queue to be vetted; and sending the electronic communication after it has been vetted.

In another aspect, there is provided a computer readable medium comprising computer executable instructions for performing the method.

In another aspect, there is provided a platform for notifying individuals of funding opportunities, the platform comprising a server device, the server device comprising a processor and memory, the memory storing processor executable instructions that when executed cause the server device to: obtaining funding information from one or more sources and populating a grants database; obtain profile data for a plurality of individuals; use the funding information and profile data to conducting a matching process; responsive to detecting a match, generate an electronic communication addressed to a matched individual; generate a token to permit access to information by interacting with the token; incorporate the token into the electronic communication; send the electronic communication to the matched individual; and responsive to a reply triggered by interacting with the token, provide access to the information.

In an example embodiment, the system can be further configured to: add the electronic communication to a queue to be vetted; and send the electronic communication after it has been vetted.

BRIEF DESCRIPTION OF THE DRAWINGS

Embodiments will now be described with reference to the appended drawings wherein.

DETAILED DESCRIPTION

Since profile tools are found to not be integrated with communication and workflow protocols for funding applications such as for grants or corporate sponsorship projects and the like, the current systems in place for matching researchers with such funding opportunities still face challenges and lack automated and other technological tools to empower RSOs and researchers themselves to take advantage of the numerous opportunities that may exist. University and private research outcomes depend on external funding. The traditional approach does not scale well considering the large number of researchers, grants/sponsorships and yet few research officers. Researcher time is therefore often spent reviewing and applying for funding, detracting from research projects. Poorly aligned objectives between research goals and funding priorities create conflict and distractions for researchers and their teams. Existing tools place a significant burden on researchers to create and maintain a profile that describes their research topics and provide limited support for communication and workflow.

To address these challenges, a platform is provided that uses proprietary matching and data analytical algorithms to pair researchers with optimal funding opportunities, reducing the time and effort to find and connect with funding. The platform produces targeted communications to the researcher from the RSOs, increasing applications for funding. The proprietary algorithm(s) can find the best matching funding opportunities for each researcher, accounting for eligibility requirements and success rates from past applications. An automated workflow enabled by the matching platform can generate custom messages for each researcher and track metrics.

Figure 1:
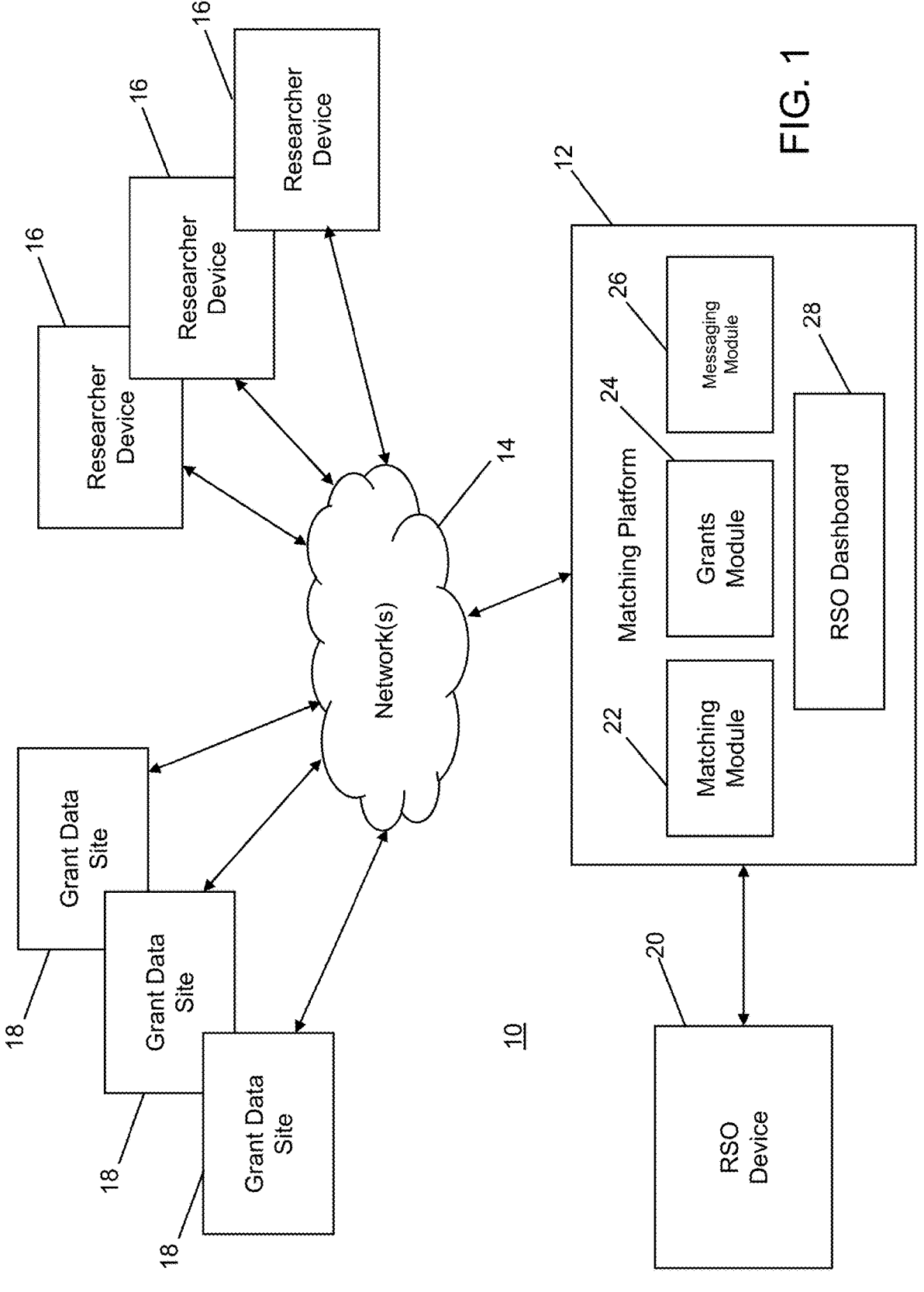
FIG. 1 is a block diagram of an example of a computing environment in which a matching platform can be deployed.

Turning now to the figures, FIG. 1 illustrates a computing environment 10 in which a matching platform 12 can be deployed. The matching platform 12 is connectable and communicable within the computing environment 10 via a network 14, with a number of client devices, referred to herein as researcher devices 16 and RSO devices 20, as well as other computing devices, servers or computing systems that contain, publish or otherwise include grant data, referred to herein as grant data sites 18. While the example shown in FIG. 1 references grants, grant data, etc., the platform 12 and environment 10 can be adapted for any type of funding opportunity. The researcher device 16 and RSO device 20 can include mobile/smart phones, tablet computers, desktop computers, etc. The grant data site 18 can include a server, service or other computing entity capable of hosting and providing information and other data concerning grants that are available to researchers such as professors. While three researcher devices 16, three grant data sites 18, and one RSO device 20 are shown in FIG. 1, it can be appreciated that this is purely illustrative and that any number of devices 16, 18, 20 can be configured to communicate with the computing environment 10.

The network 14 shown in FIG. 1 is a network 14 such as a wired and/or a wireless communication system, for example, an Internet-based network accessible or otherwise used by the matching platform 12. The network 14 can include a communications network such as a telephone network, cellular, and/or data communication network to connect different types of communication devices. For example, the network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

The matching platform 12 is illustrated at a high level in FIG. 1, with further details provided below. Illustrated in FIG. 1 are a matching module 22 to perform matching processes, a grants module 24 to coordinate and implement the obtaining and utilization of grant information provided by the grant data sites 18, a messaging module 26 to generate and coordinate the messaging workflow within the platform 12 and computing environment 10 more widely, and an RSO dashboard 28 to enable RSO devices 20 (e.g., operated by RSOs) to utilize the matching platform 12. Various other modules may be included in or hosted by the matching platform 12, such as other dashboards for researchers or other personnel, as discussed in greater detail below.

It can be appreciated that the matching platform 12 can be implemented using a client device (e.g., computing device such as that shown in FIG. 8) which includes one or more processors other data storage devices storing device data and application data, the processor(s) being configured to execute instructions that utilize the modules and components described herein by implementing communication protocols utilized by the particular configuration and/or application. That is, while not delineated in FIG. 1, the matching platform 12 includes at least one memory or memory device that can include a tangible and non-transitory computer-readable medium having stored therein computer programs, sets of instructions, code, or data to be executed by a processor. It can be appreciated that any of the modules and applications shown in FIG. 1 may also be hosted externally and be available to the matching platform 12.

Figure 2:
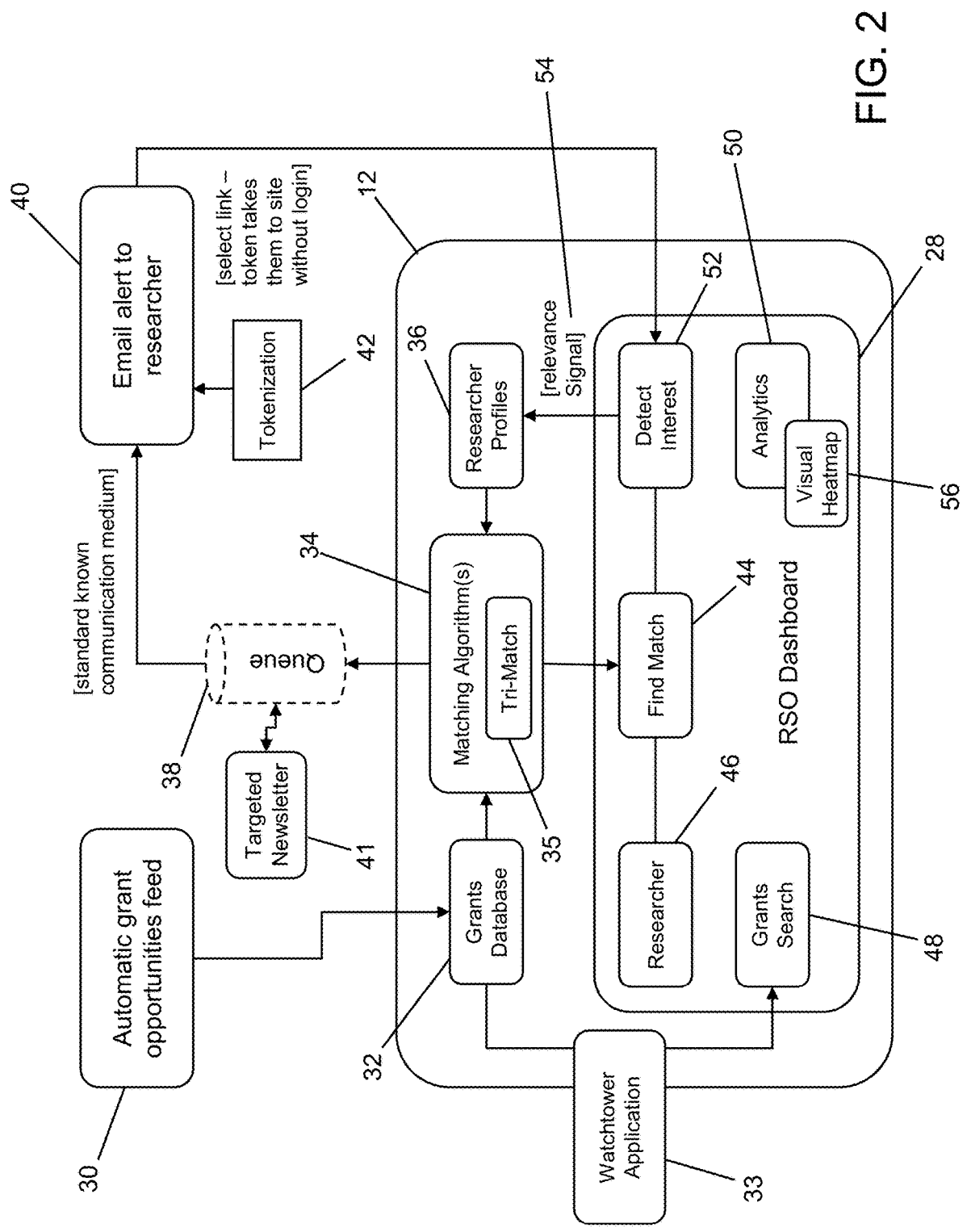
FIG. 2 is a block diagram of the matching platform illustrating an analytics and communication workflow.

Referring now to FIG. 2, a configuration and workflow that can be implemented by the matching platform 12 is shown. An automatic grant opportunities feed 30 is shown, which illustrates any source and/or service that can be arranged to scrape or otherwise obtain data and other information from, for example, the grant (or other funding) data sites 18. The feed(s) 30 can obtain data periodically, e.g., daily and can be subscribed to only pull new data at each interval. That is, the feed(s) 30 can be triggered to import new data only when new content is posted, or previously consumed content is changed. In this way, the feed(s) 30 intelligently update the grants database 32 to keep the matching platform 12 up to date without overwhelming or duplicating efforts. This can include indexing and tagging grant information as it is obtained and stored in the grants database 32. When a grant source changes, an internal process can be triggered to notify anyone who is tracking or monitoring that opportunity to let them know that it has changed. The feed(s) 30 can be implemented as one or more processes that operate via the network 14 to scrape content from a variety of grant publication sources. The feed(s) 30 can be adapted to different structures of data feeds to extract specific, targeted metrics and overview information from grant sources to funnel these one or more streams of relevant data into the internal grants database 32.

A researcher profiles module 36 can load researcher (e.g., professor) profiles from multiple sources. The primary source is often a university (or lab) web site that posts the research topics, past publications, and other CV data for the professor or researcher. Additional sources may include lists of publications (such as Google Scholar), past grant awards (such as Cognit.ca), publication and citation databases, and customized criteria created by a local research officer to inform the system about specific research interests of a professor. The matching platform 12 can also provide an option for professors to "export" their profile information as a properly structured "common CV" format which may be used for future grant applications.

One or more matching algorithms 34 is/are used to match grant opportunities against the pre-populated profiles for individual researchers. The matching algorithm 34 that is used ranks each grant against each researcher and can select a top "n" (e.g., 5 or 10) grant opportunities. For example, the matching algorithm(s) 34 can use keyword matching (e.g., using weighting on certain keywords), wherein each grant has a list of automatically extracted keywords and each researcher has a list of keywords that describe their research interests. Other algorithms or sub-modules may be provided, such as the tri-match module 35 shown in FIG. 2. The tri-match module 35 may be used to implement "tri-matches", which refer to matches that contain a grant, a researcher, and a corporate sponsor (or pluralities thereof). Further details concerning the tri-match module 35 are provided below.

Keyword weighting may be utilized to facilitate matching, as indicated above. The platform 12 operates with three types of entities in the example shown, namely a grant, a researcher, and a project. Each of these entities has two kinds of keywords, namely system keywords and user keywords. System keywords may be generated using natural language processing (NLP) algorithms, or may be found using human intelligence via a data intelligence team. User keywords may be inserted by a user via a user interface (e.g., a GUI) provided by the platform 12. It has been recognized that since entities can have common keywords, such keywords can be used as a basis for a matching algorithm 34. To illustrate, consider that keywords may have certain properties. For instance, a keyword is a string, and thus can have a number of characters referred to as a "length". A keyword may also be a phrase and thus contain multiple words. A keyword may also be present in one or more entities and may be auto-generated or user defined.

To formulate a weighted keyword matching algorithm 34, all keywords present in the system may be obtained to prepare a bank of keywords. The keywords may then be grouped based on the above properties. In the example illustrated below, keywords were grouped based on their number of appearances. Some keywords are not repeated, i.e., only appeared once. Some keywords appears twice across all entities while some keywords appeared more than tens times. Keywords could be grouped on other bases such as the sum or entities or spread of entities as shown in Table 1 below, which illustrates a few rows from a keyword analysis conducted for the platform 12.

TABLE 1

| | | Sum Entity count | Spread of entity | Grant Count | Researcher Count | Project Count |
|---|---|---|---|---|---|---|
| Total Count | Total Keywords | | | | | |
| 1 | 4110 | 4110 | 3 | 2408 | 995 | 707 |
| 2 | 503 | 1006 | 3 | 652 | 285 | 69 |
| 3 | 186 | 558 | 2 | 430 | | 128 |
| 4 | 70 | 280 | 2 | | 180 | 100 |

In this example, there are 503 keywords that repeated two times in all entities. These keywords are spread across all three entities, found in 652 grants, 285 researchers and 69 projects. For example, the keyword 'cyber security' has appeared in one grant and one researcher. There are number of factors that can be considered to find the weight of the keyword. To simplify the process, it was decided to define the weighting formula to be based on total count.

The "Total Count" combines a broad range of keywords into manageable groups and limits the complications as the number of keywords increases every day. In general, the keywords that appeared only once are very rare and won't participate in match, so they been assigned a weight of 1. The keywords that appeared twice are also rare but since they appeared in two entities, they are a good candidate for a match. The keywords that show up more often participate in the match but as the number of occurrences increases the keywords are found to lean towards being general phrases.

The weight of the keyword reduces as the keyword falls into higher values of "Total Count" group. Based on the keyword analysis conducted, the "Total Count" was grouped into a colored category and assigned weight to each category as shown in the chart of FIG. 9 and Table 2 below.

TABLE 2

| Sample Weighting Table | |
|---|---|
| Total Count | Weight |
| 1 | 1 |
| 2-3 | 10 |
| 4-6 | 9 |
| 7-8 | 8 |
| 9-10 | 7 |
| 11-12 | 6 |
| 13-14 | 5 |
| 15-20 | 4 |
| 21-25 | 3 |
| 26 Onwards | 1 |

Figure 9:
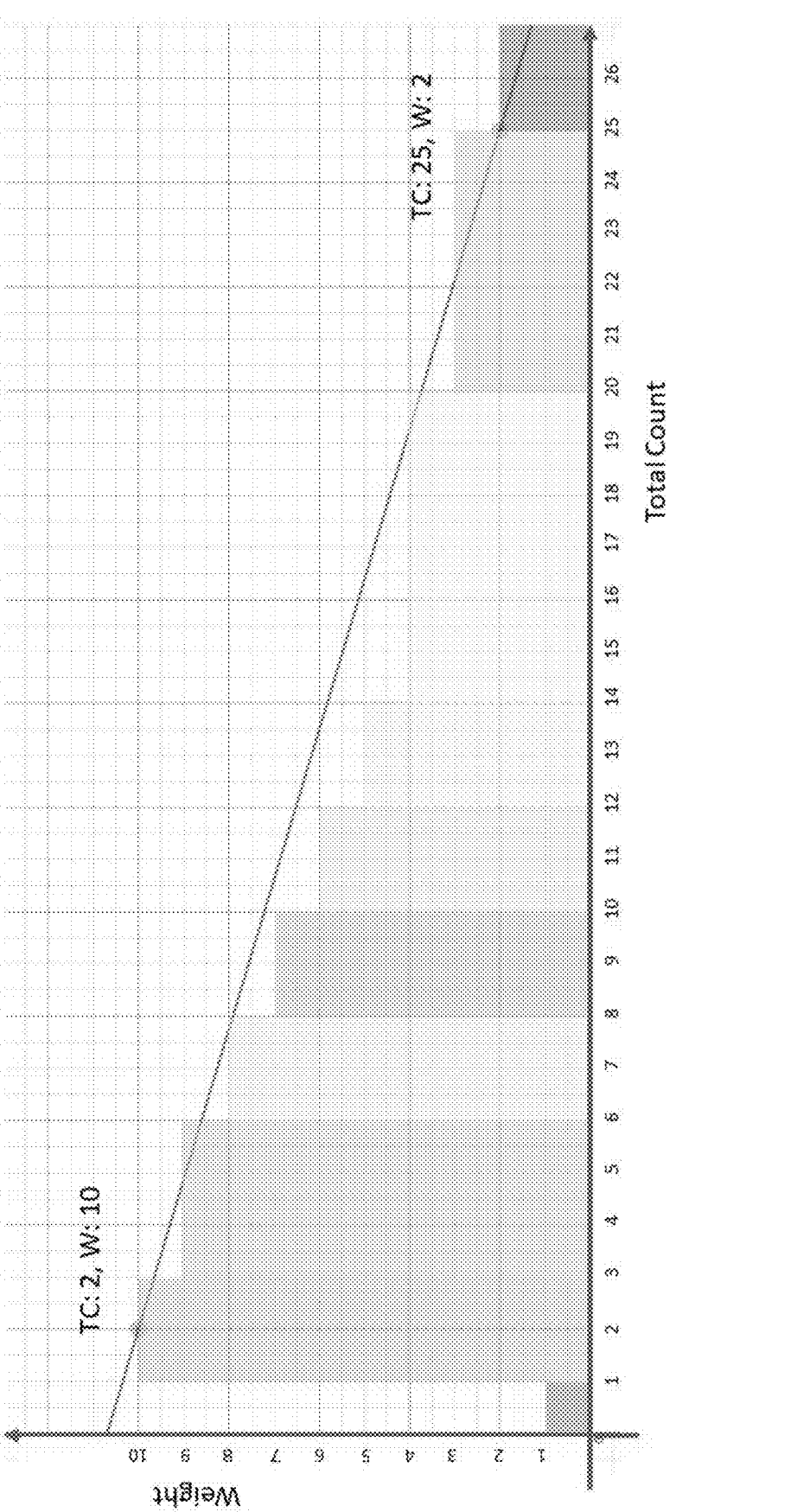
FIG. 9 is a chart illustrating a total keyword count versus weight.

Based on these categories one can draw a line as shown in FIG. 9 and use a formula of a line that passes through two points. This creates a smooth pattern of weight distribution across "Total Count" categories.

The final weight formula is as shown below:

$$\text{Weight}=1, \text{ where Total Count} \leq x1$$

$$\text{Weight}=((\text{Total})\text{Count}-x1)*(y2-y1)/(x2-x1))+y1,$$
$$\text{where } x1 <= \text{Total\_Count} <= x2$$

$$\text{Weight}=1, \text{ where Total Count} > x2$$

As depicted in FIGS. 9, x1=2, y1=10, x2=25 and y2=2.

These data points are configurable and might be adjusted based on further analysis. A match can have more than one keyword, each keyword has individual weight, so we take the maximum weight and assign it to the match.

Referring again to FIG. 2, in this example, the number of keyword matches indicates the strength of the match. Alternatively, sentiment analysis techniques can be used to improve the accuracy of the matching algorithm 34, wherein the matching algorithm 34 looks at longer sequences of text to associate meaning to how key words are used.

When a match is found, a message alert to the researcher is generated using a standard known communication medium such as email, to provide a convenient and familiar way to contact and engage with the researcher. For example, a targeted email can be sent from the email identity of a research officer (e.g., a specific RSO or RSO office) who is assigned to that researcher. It can be appreciated that matches can be performed against a "team" of researchers (either existing or potential), with the platform 12 configured to send notifications to a collection of individuals at one time. Additionally, a meeting invitation, conference call, social media group (e.g., messaging group), or other grouping mechanism can be used to immediately form a team with this group of individuals to begin discussing a potential collaboration on a single grant or multiple related grants. As shown in dashed lines, a queue 38 can be used to hold the targeted alerts to provide an RSO the opportunity to review, edit, and approve the targeted alerts, in this example, via the RSO dashboard 28. As described further below, a targeted newsletter service 41 may be used to bundle multiple funding opportunity options into the email alerts 40. For example, through the RSO dashboard 28, the RSO can be given the option to review the prioritized choices of research opportunities determined through the matching process and, if appropriate, adjust the ranking so that only the best opportunities are sent out to each professor through the message alert process. It can be seen that the automatic grant opportunities feed(s) 30, the researcher profiles 36, and the matching algorithm module 34 can offload significant time and effort from the RSOs to provide them with relevant and curated information to allow them to more efficiently and quickly push these opportunities out to researchers. Moreover, the queue 38 may be optional such that in certain instances or under certain circumstances, a completely automated process can be implemented. In this way, both automated and semi-automated tools can be provided to the RSOs to allow for the management of larger groups of researchers while targeting a wider range of opportunities. Additionally, outbound messages can be scheduled, e.g., to trigger grant opportunities when it is determined or otherwise known that a professor/researcher recently had a batch of students graduate and it is expected that a new batch of students will be brought in and require funding. Similarly, when approaching the end of an existing grant, the platform 12 can be triggered to start a drip campaign to remind them to look at new opportunities as the expiration approaches.

When an alert is sent, in this example via email, the email body can be configured to contain one or more embedded web links (e.g., URLs) which may be in the form of HTML-encoded "buttons" or as raw links. These links can include pre-computed tokens that are unique for each email, for each professor. A tokenization module 42 is shown in FIG. 2, which can be used by an email alert module 40 to generate and embed such tokens or other links in order to facilitate interaction with the message. For example, when a link is activated, the link can redirect and bring the user to the matching platform 12 and land them on information concerning the grant opportunity. In other examples, with appropriate security mechanisms in place, selecting the link could log them in to an account that is reserved for the recipient of the email. This eliminates the need for the researcher to actively enter a user name or password—they simply click through the link to access the information concerning the grant opportunity or, if available, directly to their own data within the platform 12. The email links can have information on one or more research opportunities— for example those that represent the highest ranked opportunities for the researcher. The recipient has the option to click through a link that acknowledges an interest in learning more about the opportunity. In this example, the email notification may also have a link (or button) that indicates that the recipient is not interested in the opportunity. This link can bring the user to a page where they can provide more detail on why they felt that the grant was not appropriate for them at this time (e.g., criteria do not match, wrong research topic, professor already fully loaded with students or projects, etc.)

Within the RSO dashboard an analytics module 50 can be used to analyze and adjust the way opportunities are ranked in the future. The analytics module 50 may include or have access to a visual heatmap tool 56, which may be used to create visual heatmaps of research topics, discussed further below. A detect interest module 52 can be used to correlate interactions with the targeted messages to matches that were found by a find match module 44, and the researchers 46 to which the opportunity was presented (with multiple researchers possibly receiving the same opportunity). The grants search module 48 can be provided as a search capability that enables the platform to view, search, and understand the current grants that it can access in the grants database 32 discussed above. An important part of the research impact process is the ability to import information about individual grants. However, new grants are published and in some cases, published grants may change. In order to adapt to these changes, the platform 12 should be able to load the latest grant data. A watchtower application 33 may be used to monitor all known grants. The watchtower application is described further below.

As such, the platform 12 can maintain metrics on opportunities presented and those that are accepted or rejected. This information can be displayed to the RSO on their dashboard. The metrics can also be used to change the prioritization of research topics—e.g., if a professor has rejected an opportunity as not relevant, then similar opportunities will be ranked lower in the future. The platform 12 also allows RSOs to enter information about which opportunities have progressed to file an application and which applications were awarded as grants. The platform 12 can also integrate with third party systems to automate this feedback loop. Data on applications and successful grants can be used to update the matching algorithm. Successful applications and grants can be added to the professor's profile and used to enhance future matches.

As illustrated in FIG. 2, various additional modules can be utilized in operating the platform 12.

Noted above, a tri-match is a match that contains a grant, a researcher, and a corporate sponsor. Corporate sponsorship projects can be added to the database 32 in a way similar to grant opportunities 30. Corporations provide a description of a strategic project on which they would like to collaborate with an expert researcher. The description includes specific outcomes, technology topic areas, and any special equipment or procedures that will be needed. A project may also include a budget that the company is willing to pay to support the work and a target timeframe for completion of the work. Based on the text provided by the company, the platform 12 can extract keywords, using an algorithm 34 similar to the one used for grants by invoking the tri-match module 35. Matching is done first between researchers and grants. Once this is complete, each researcher+grant match is then tested against all corporate projects. In cases where there is sufficient similarity among the keywords, a "tri-match" is defined. This is presented to the user as a package option. It may be noted that the name of the company may be hidden from the researcher and research administrator when they review the tri-match options. If a researcher expresses an interest in working with the company, the name of the researcher is then revealed to the company. If the company accepts the researcher, then the name of the company is revealed to the researcher. This method, called "selective reveal" is used to protect the identity of the company and their strategic plan. A similar approach to a tri-match may also be used to match with collaborators. In a similar way to the one described above, a primary researcher is first matched to a grant, and this match is then compared against the profiles of other researchers. If there is a good fit, then a collaborator option may be presented to the primary researcher. In this case, the identity of the collaborator may be shown or suppressed, based on the preferences of the potential collaborator.

As noted above, an important part of the research impact process is the ability to import information about individual grants. However, new grants are published and in some cases, published grants may change. In order to adapt to these changes, the platform 12 should be able to load the latest grant data. The watchtower application 33 can be used to monitor all known grants. For example, on a scheduled basis, the watchtower application 33 may visit a list of URLs where previously identified grants have been published, and the grant description downloaded for each. This grant description is then compared against the previously downloaded description of the same grant. If they are identical, no further action is needed. If they are different, then the new description becomes the current grant description, the database fields are updated with data from the new grant description. This includes the list of keywords which will be derived from the new grant description. After running the watchtower application 33, the matching (and tri-match) algorithms 34 may be re-run to update the researcher to grant match relationships.

In examples described herein, the platform 12 may be used to produce a targeted email 40 that contains a single grant opportunity. However, some researchers prefer to see multiple options. Many office of research departments also have a requirement to distribute news and information to the community of researchers. They normally do this through periodic newsletters that are sent out in email. These concepts may be combined using the targeted newsletter feature 41. This feature 41 sends each researcher a short list of grants that are close matches to their individual profile. Included in the message may be a collection of news and information provided by the office of research. The news material may be filtered based on the researcher's department, field of research, or preferences. The targeted newsletter may contain URL links that allow the researcher to click through to learn more about each grant. These links can be personalized and allow the researcher to access the platform 12 without using a password (as illustrated in examples provided herein). The platform 12 may also use this information to track user activity.

With respect to the analytics tool 50, it is recognized that the platform 12 may collect data about the types of research being done by the faculty at a university. This data can be used to create a visual "heat map" of research topics using the visual heatmap feature 56. This could be presented as a 2D map where colors represent the number of researchers or funded projects currently active among several different research topic areas.

Figure 3:
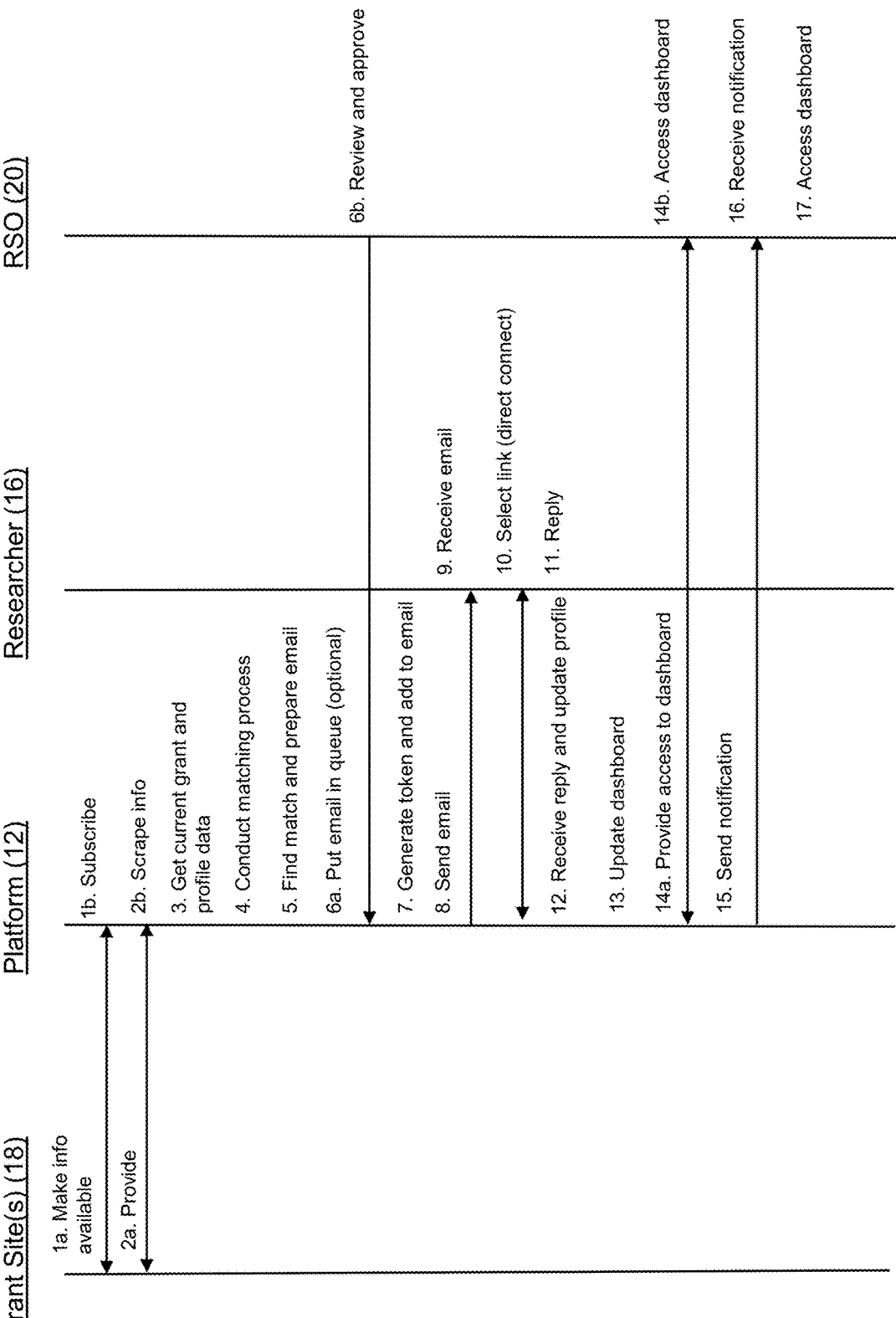
FIG. 3 is a sequence diagram illustrating an example of the analytics and communication workflow shown in FIG. 2.

FIG. 3 provides a sequence diagram to illustrate an example of a matching process implemented by the matching platform 12 and using an email-type alert. At step 1a one or more grant sites 18 make information available to the public or to subscribers. In this example, at step 1b the platform 12 subscribes to at least one grant information feed, which can include an RSS feed, subscriber newsletter, obtain login credentials, or simply store a website link for later use. At step 2a the grant site(s) 18 provide the data, which as note above, can be passive (by virtue of having the information publicly available) or active by generating a newsletter or feed. At step 2b, the platform scrapes the information using any appropriate mechanism such as actively visiting the site(s) 18 or obtaining and analyzing fed content. The platform 12 at step 3 gets current grant data and researcher profile data and at step 4 conducts the matching process by using the matching module 22 and matching algorithm 34 (which may or may not utilize the tri-match module 35).

In this example, a match is found, and the email is prepared at step 5. This may include an email with a single targeted opportunity or a targeted newsletter with multiple options as discussed above. Optionally, the email can be placed in the queue 38 at step 6a to be reviewed (optionally edited) and approved at step 6b. The platform 12 then generates a token at step 7 and adds to the email to enable the researcher to conveniently interact with the email to provide feedback. At step 8 the email is sent and is received at step 9.

The researcher (using a researcher device 16) may then open the email and select the tokenized link at step 10 to activate a direct connection into their account provided by the matching platform 12. It is assumed in this example scenario that the researcher replies to the email at step 11 and the matching platform 12 receives the reply and updates the researcher's profile at step 12. Other operations can be triggered by the reply at step 11 such as using the analytics module 50 and creating notifications by the RSO dashboard to the corresponding RSO. For example, at step 13 the matching platform 12 can update the RSO dashboard 28, provide access to the dashboard 28 at step 14a and enable the RSO to access the dashboard at step 14b, e.g., using an RSO device 20. The matching platform 12 can, either in response or in parallel, send a notification at step 15 which is received by the RSO device 20 at step 16. The RSO is then able to again access the dashboard 28 in response to the notification. For example, in addition to regular access to the RSO dashboard 28, the RSO may receive triggered notifications at step 15 that relate to interactions and feedback provided by a researcher they are responsible for, which can be used to direct the RSO into the dashboard 28 to the appropriate information, analytics, reports, or other information.

Figures 4, 5:
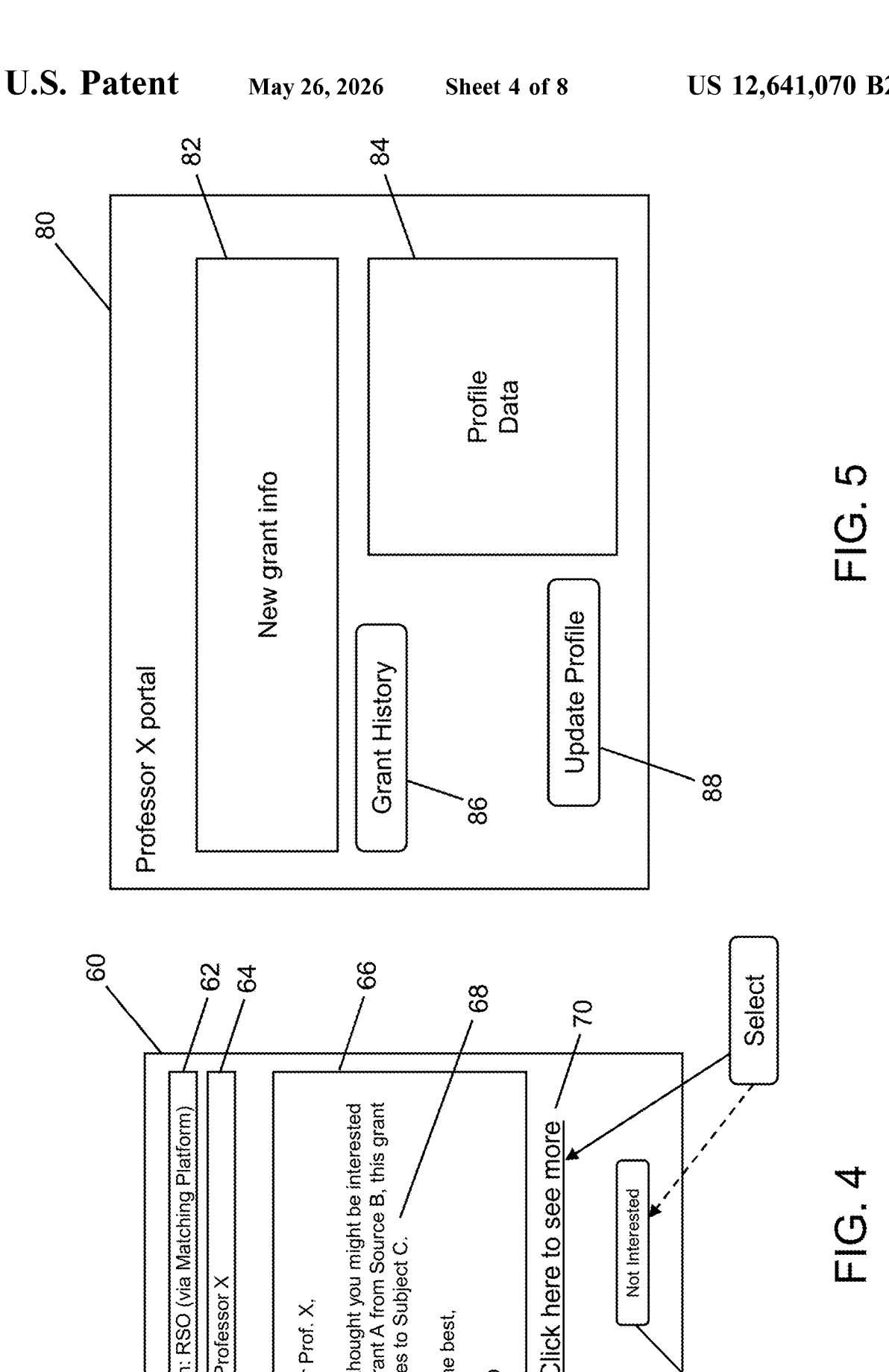
FIG. 4 is a user interface illustrating a customized message sent to a researcher by the platform.
FIG. 5 is a user interface illustrating a researcher portal.

FIG. 4 illustrates an example of an opportunities email 60 sent to "Professor X" by an RSO, via the matching platform 12 on its behalf. The email 60 is a standard and familiar format that the professor in this case would be used to interacting with. It can be appreciated that other communication media such as text messages, push notifications (via an app) and the like can be used if more appropriate that email. For example, researcher profiles can allow the researcher to specify communication preferences to allow the matching platform 12 to tailor the communication feedback loop to the preferences of the researchers. The email body 66 in this example includes a targeted message 68 that is generated automatically by the email module 40 according to the matched opportunity. The queue 38 can be used to allow RSOs to further curate and edit the targeted message 68 as discussed above. A link 70 is also shown in FIG. 4, which can be a hyperlink as shown, an interactive button or other UI mechanism that allows interactivity and redirection to the researcher portal UI 80 shown in FIG. 5. As also shown in FIG. 4, a Not Interested option 72 can also be provided to allow the researcher to consider but ignore the opportunity without requiring further interactions, input, efforts or time.

Referring now to FIG. 5, the researcher portal UI 80 can be used to allow the researcher to access their personal content via the link 70 in the email 60 without logging in. This reduces the friction associated with responding to any interest in an opportunity. For example, the UI 80 can include new grant info 82, as well as profile data 84. The profile data can be edited by selecting an Update Profile option 88 and past opportunities and other grant information can be accessed by selecting a Grant History option 86. The new grant info 82 can be used to directly and immediately provide the researcher with the targeted information which triggered the email 60 and conveniently provide useful information, other links (not shown) and contact information. The new grant info 82 can also be used to lead the researcher to fillable forms and/or provide a communication link to their RSO to have a grant application initiated.

Figure 6:
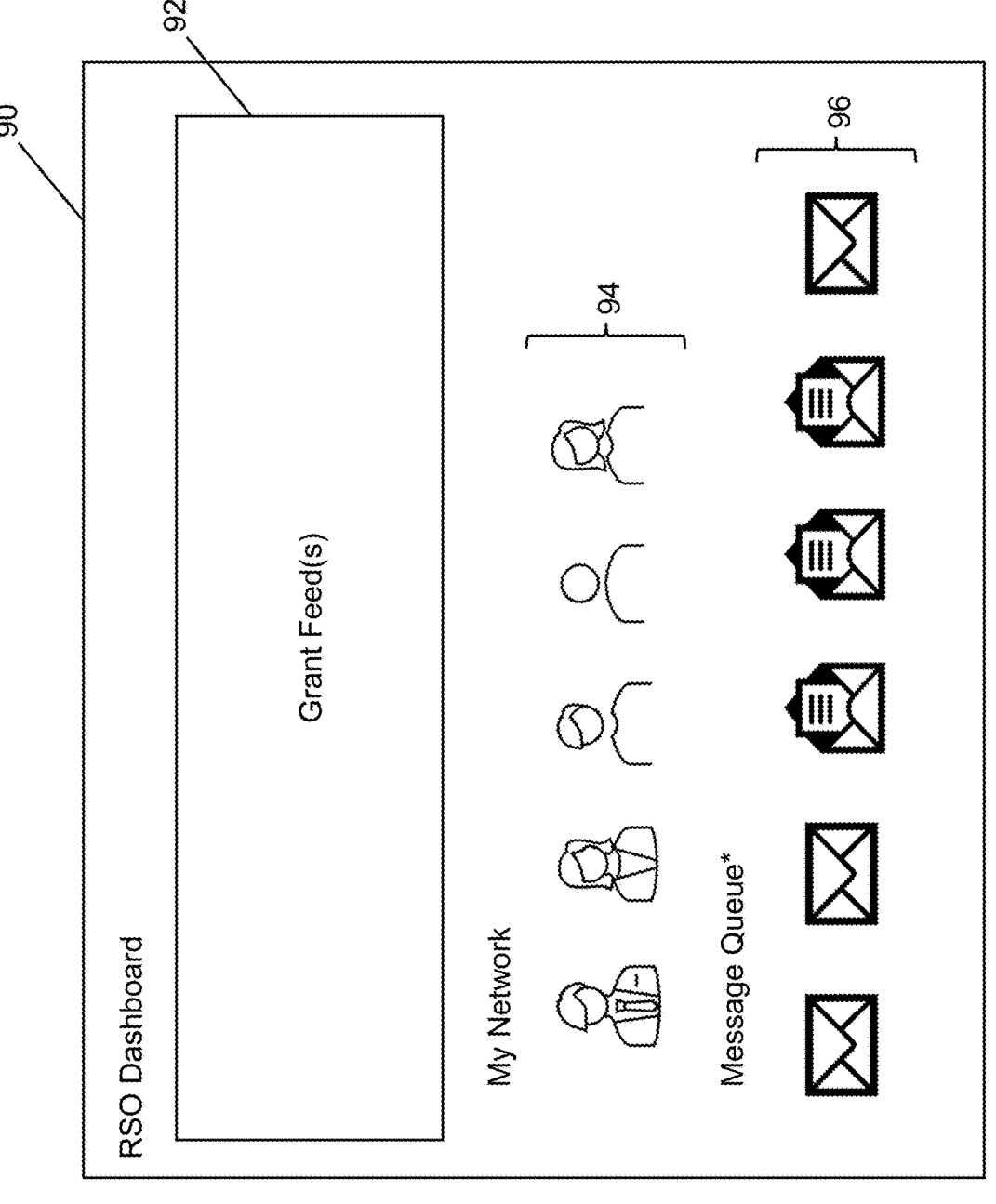
FIG. 6 is a user interface illustrating an RSO portal.

FIG. 6 illustrates an RSO dashboard UI 90. In this example, the UI 90 includes a grant feeds portion 92 that allows the RSO to view current grant feeds and/or provide links to the associated grant sites 18. The RSO dashboard UI 90 can also provide a My Network portion 94 to allow the RSO to see which researchers are under their oversight. Similarly, a message queue portion 96 can be provided to give the RSO access to messages that have been queued for them as well as show the status (e.g., opened envelope shows in progress versus closed envelope which has not been viewed).

Figure 7:
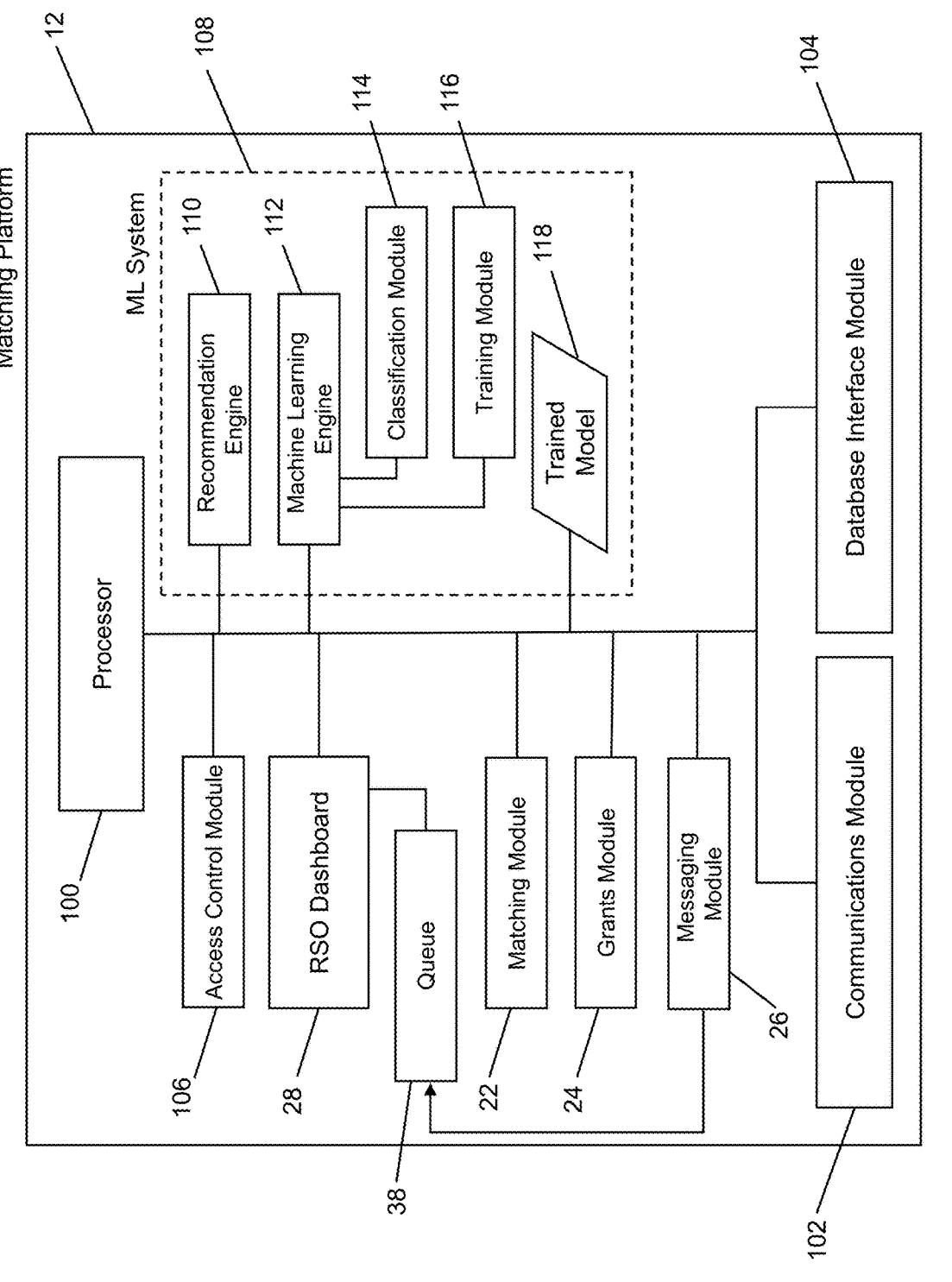
FIG. 7 is a block diagram illustrating an example of a configuration for implementing the matching platform.
Figure 8:
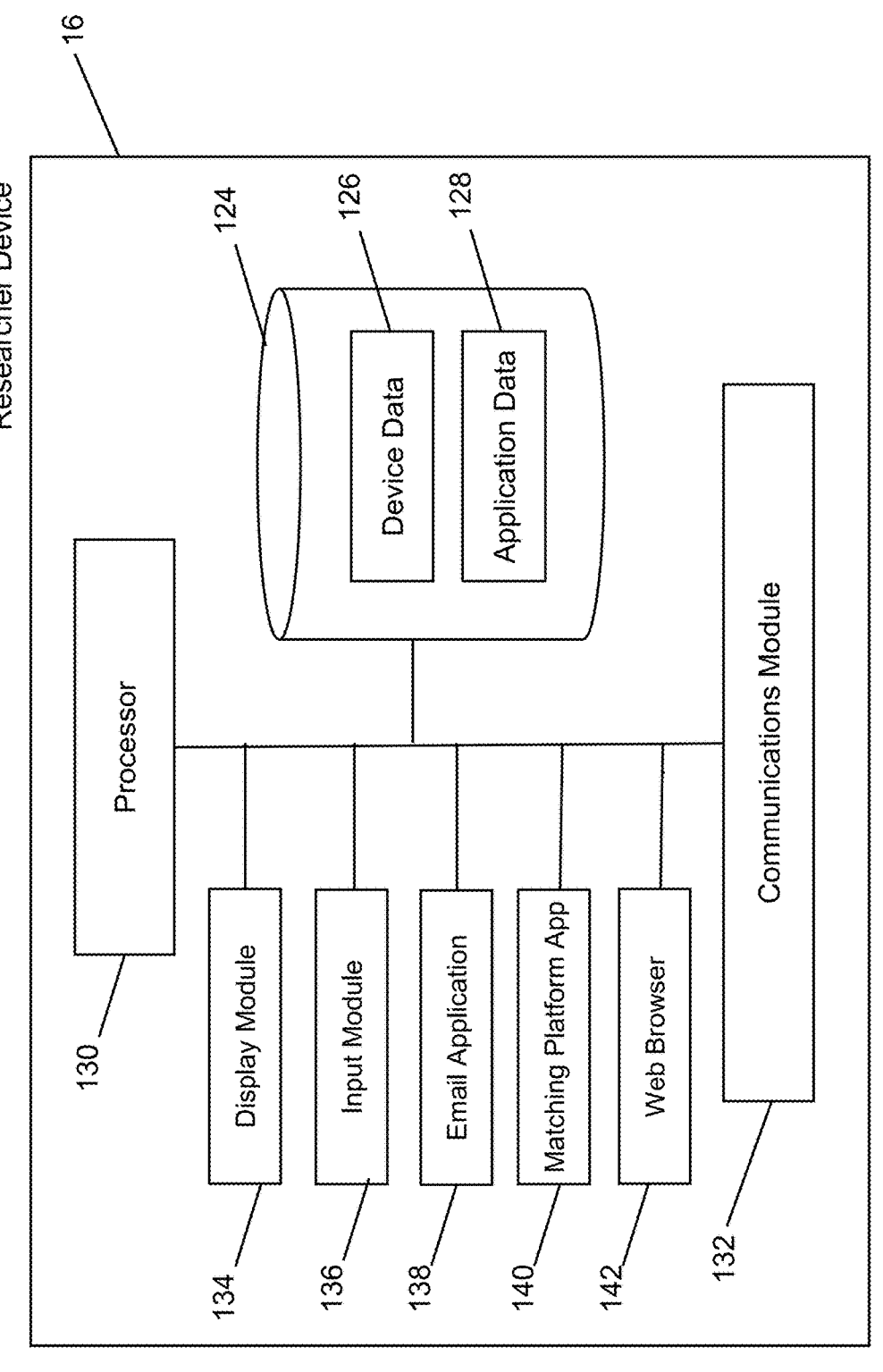
FIG. 8 is a block diagram illustrating an example of a configuration for a client device, in this example a researcher device.

FIGS. 7 and 8 provide example configurations for the matching platform 12 and the various devices that can interact with the matching platform 12 via the network 14, for example a researcher device 16 such as a smartphone or tablet computer as illustrated in FIG. 8.

In FIG. 7, an example configuration of the matching platform 12 is shown. In certain embodiments, the matching platform 12 may include one or more processors 100, a communications module 102, and a database interface module 104 for interfacing with the datastores associated with grant data, researcher profiles, etc. Communications module 102 enables the matching platform 12 to communicate with one or more other components of the computing environment 10, such as researcher device 16 (or one of its components), via a bus or other communication network, such as the communication network 14. While not delineated in FIG. 7, the matching platform 12 includes at least one memory or memory device that can include a tangible and non-transitory computer-readable medium having stored therein computer programs, sets of instructions, code, or data to be executed by processor 100. FIG. 7 illustrates examples of modules, tools and engines stored in memory on the matching platform 12 and operated by the processor 100. It can be appreciated that any of the modules, tools, and engines shown in Fla 7 may also be hosted externally and be available to the matching platform 12, e.g., via the communications module 102. In the example embodiment shown in FIG. 7, the matching platform 12 includes a machine learning (ML) system 108, which includes a recommendation engine 110, a machine learning engine 112, a classification module 114, a training module 116, and a trained model 118. The matching platform 12 also includes an access control module 106 and the RSO dashboard 28. The RSO dashboard 28 includes or has access to the queue 28. The matching platform 12 also includes the matching module 22, the grants module 24, and the messaging module 26, which can interface with the queue 38 as shown.

In implementations wherein the matching involves more than keyword matching (with or without weighting) or sentiment analysis, the ML system 108 can be used to utilize more sophisticated machine learning techniques. For example, the recommendation engine 110 can be used by the ML system 108 to generate one or more recommendations for the matching module 22. For example, the matching module 22 can utilize the ML system 108 to input current grant and researcher profile data to the trained model 118 to generate recommendations for the matches, which can then be prioritized based on various factors as noted above. This can include accessing the language server or module in order to apply NLP/NLU processes. It may be noted that a recommendation as used herein may refer to a prediction, suggestion, inference, association or other recommended identifier that can be used to generate a suggestion, notification, command, instruction or other data that can be viewed, used or consumed by the matching module 22 or matching platform 12 more generally. The recommendation engine 110 may utilize or otherwise interface with the machine learning engine 112 to both classify data currently being analyzed to generate a suggestion or recommendation, and to train classifiers using data that is continually being processed and accumulated by the matching platform 12. That is, the recommendation engine 110 can learn request- or response-related preferences and revise and refine classifications, rules or other analytics-related parameters over time. For example, the ML system 108 can be used to update and refine the trained model 118 using the training module 116 as client devices 16, 18, 20 interact with the matching platform 12 to improve the NLP/NLU parameters and understanding of how users interact with the matching platform 12.

Examples of adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of event data (e.g., a value or type of data being augmented with an event or workflow) and a single classification parameter and additionally, or alternatively, multiple classification parameters.

Based on the output of the one or more machine learning algorithms or processes, such as the one-dimensional, convolutional neural network model described herein, ML system 108 may perform operations that classify each of the discrete elements of event- or workflow-related content as a corresponding one of the classification parameters, e.g., as obtained from classification data stored by the classification module 114.

The outputs of the machine learning algorithms or processes may then be used by the recommendation engine 110 to generate one or more suggested recommendations, instructions, commands, notifications, rules, or other instructional or observational elements that can be presented to the matching module 22.

The access control module 106 may be used to apply a hierarchy of permission levels or otherwise apply predetermined criteria to determine what data can be shared with which entity in the computing environment 10. The RSO dashboard 28, queue 38, matching module 22, grants module 24 and messaging module 26 can operate together with the matching platform 12 as detailed above.

In FIG. 8, an example configuration of a researcher device 16 is shown. It can be appreciated that configuration shown in FIG. 8 can also represent a configuration for any of the devices used in the computing environment 10, e.g., a grant site 18, RSO device 20, etc. hi certain embodiments, the researcher device 16 may include one or more processors 130, a communications module 132, and a data store 124 storing device data 126 and application data 128. Communications module 132 enables the researcher device 16 to communicate with one or more other components of the computing environment 10 via a bus or other communication network, such as the communication network 14, While not delineated in FIG. 8, the researcher device 16 includes at least one memory or memory device that can include a tangible and non-transitory computer-readable medium having stored therein computer programs, sets of instructions, code, or data to be executed by processor 130. Fla 8 illustrates examples of modules and applications stored in memory on the researcher device 16 and operated by the processor 130. It can be appreciated that any of the modules and applications shown in FIG. 8 may also be hosted externally and be available to the researcher device 16, e.g., via the communications module 132.

In the example embodiment shown in FIG. 8, the researcher device 16 includes a display module 134 for rendering GUIs and other visual outputs on a display device such as a display screen, and an input module 136 for processing user or other inputs received at the researcher device 16, e.g., via a touchscreen, input button, transceiver, microphone, keyboard, etc. The researcher device 16 may also include an email application 138, a matching platform app 140, and a web browser 142. The data store 124 may be used to store device data 126, such as, but not limited to, an IP address or a MAC address that uniquely identifies researcher device 16. The data store 124 may also be used to store application data 128, such as, but not limited to, login credentials, user preferences, cryptographic data (e.g., cryptographic keys), etc.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the matching platform 12, devices 16, 18, 20, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A method of notifying individuals of funding opportunities, comprising:

obtaining funding information from one or more sources and populating a database;

obtaining profile data for a plurality of individuals;

using the funding information and profile data to conduct a matching process, wherein the matching process comprises:

identifying and grouping a set of keywords associated with a grant, a researcher, or a project;

assigning a first weight to keywords having a single instance;

assigning a second weight, higher than the first weight, to keywords having a frequency count falling within a defined optimal range; and for keywords having a frequency count exceeding the defined optimality range, reducing the assigned weight as the frequency count increases until a minimum weight value is reached;

responsive to detecting a match, generating an electronic communication addressed and unique to a matched individual;

generating at least one token to facilitate interaction with the electronic communication and access the funding information, wherein the token enables matched individuals to accept or not accept the funding opportunities;

incorporating the token into a selectable element of the electronic communication;

sending the electronic communication incorporating the token in the selectable element to the matched individual; and responsive to receiving a reply with a request triggered by interacting with the token, providing access to the funding information according to data embedded in the token.

2. The method of claim 1, further comprising adding the electronic communication to a queue to be vetted; and sending the electronic communication after contents of the queue have been vetted.

3. The method of claim 1, further comprising, on a periodic basis:

obtaining at least one funding description;

comparing the funding description to a previous version;

updating a stored funding description when the description has changed based on the comparison; and repeating the matching process when a description associated with a match has changed.

4. The method of claim 1, wherein a keyword bank is stored and updated over time as the method is repeated.

5. The method of claim 1, wherein the matching process comprises identifying at least one tri-match, each tri-match comprising a match that has a grant plus a researcher plus a corporate sponsor.

6. The method of claim 5, wherein the tri-match comprises:

a first match between the researcher and the grant;

a second match between the first match and one of a plurality of corporate projects.

7. The method of claim 5, wherein a company name associated with the corporate project is hidden until the company accepts the researcher.

8. The method of claim 1, wherein the electronic communication comprises a plurality of options for grants that have been matched with the researcher, wherein each option comprises a link to further information for that grant.

9. The method of claim 1, further comprising:

responsive to selection of a heat map option, displaying a visual heat map of research topics.

10. A non-transitory computer readable medium comprising computer executable instructions for notifying individuals of funding opportunities, comprising instructions for:

obtaining funding information from one or more sources and populating a database;

obtaining profile data for a plurality of individuals;

using the funding information and profile data to conduct a matching process, wherein the matching process comprises:

identifying and grouping a set of keywords associated with a grant, a researcher, or a project;

assigning a first weight to keywords having a single instance;

assigning a second weight, higher than the first weight, to keywords having a frequency count falling within a defined optimal range; and for keywords having a frequency count exceeding the defined optimality range, reducing the assigned weight as the frequency count increases until a minimum weight value is reached;

responsive to detecting a match, generating an electronic communication addressed and unique to a matched individual;

generating at least one token to facilitate interaction with the electronic communication and access the funding information, wherein the token enables matched individuals to accept or not accept the funding opportunities;

incorporating the token into a selectable element of the electronic communication;

sending the electronic communication incorporating the token in the selectable element to the matched individual; and responsive to receiving a reply with a request triggered by interacting with the token, providing access to the funding information according to data embedded in the token.

11. A platform for notifying individuals of funding opportunities, the platform comprising a server device, the server device comprising a processor and memory, the memory storing processor executable instructions that when executed cause the server device to:

obtaining funding information from one or more sources and populating a database;

obtaining profile data for a plurality of individuals;

using the funding information and profile data to conduct a matching process, wherein the matching process comprises:

identifying and grouping a set of keywords associated with a grant, a researcher, or a project;

assigning a first weight to keywords having a single instance;

assigning a second weight, higher than the first weight, to keywords having a frequency count falling within a defined optimal range; and for keywords having a frequency count exceeding the defined optimality range, reducing the assigned weight as the frequency count increases until a minimum weight value is reached;

responsive to detecting a match, generating an electronic communication addressed and unique to a matched individual;

generating at least one token to facilitate interaction with the electronic communication and access the funding information, wherein the token enables matched individuals to accept or not accept the funding opportunities;

incorporating the token into a selectable element of the electronic communication;

sending the electronic communication incorporating the token in the selectable element to the matched individual; and responsive to receiving a reply with a request triggered by interacting with the token, providing access to the funding information according to data embedded in the token.

12. The system of claim 11, further configured to:

add the electronic communication to a queue to be vetted; and send the electronic communication after contents of the queue have been vetted.

13. The system of claim 11, further configured to:

obtain at least one funding description;

compare the funding description to a previous version;

update a stored funding description when the description has changed based on the comparison; and repeat the matching process when a description associated with a match has changed.

14. The system of claim 11, wherein a keyword bank is stored and updated over time as the method is repeated.

15. The system of claim 11, wherein the matching process comprises identifying at least one tri-match, each tri-match comprising a match that has a grant plus a researcher plus a corporate sponsor.

16. The system of claim 15, wherein the tri-match comprises:

a first match between the researcher and the grant;

a second match between the first match and one of a plurality of corporate projects.

17. The system of claim 15, wherein a company name associated with the corporate project is hidden until the company accepts the researcher.

18. The system of claim 11, wherein the electronic communication comprises a plurality of options for grants that have been matched with the researcher, wherein each option comprises a link to further information for that grant.

\* \* \* \* \*